US010670820B2

(12) United States Patent
Kaji et al.

(10) Patent No.: US 10,670,820 B2
(45) Date of Patent: Jun. 2, 2020

(54) OPTICAL FIBER UNIT AND OPTICAL FIBER CABLE

(71) Applicant: FUJIKURA LTD., Tokyo (JP)

(72) Inventors: Tomoaki Kaji, Sakura (JP); Soichiro Kaneko, Sakura (JP); Mizuki Isaji, Sakura (JP); Kouji Tomikawa, Sakura (JP); Ken Osato, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/326,097

(22) PCT Filed: Sep. 11, 2017

(86) PCT No.: PCT/JP2017/032663
§ 371 (c)(1),
(2) Date: Feb. 15, 2019

(87) PCT Pub. No.: WO2018/056093
PCT Pub. Date: Mar. 29, 2018

(65) Prior Publication Data
US 2019/0212512 A1    Jul. 11, 2019

(30) Foreign Application Priority Data

Sep. 20, 2016  (JP) ................................. 2016-183490

(51) Int. Cl.
*G02B 6/44*  (2006.01)
*G02B 6/04*  (2006.01)

(52) U.S. Cl.
CPC ............. *G02B 6/4413* (2013.01); *G02B 6/04* (2013.01); *G02B 6/44* (2013.01)

(58) Field of Classification Search
CPC ........... G02B 6/4413; G02B 6/04; G02B 6/44
See application file for complete search history.

(56) References Cited

U.S. PATENT DOCUMENTS

| 5,165,003 A | 11/1992 | Carter |
| 2003/0091307 A1 | 5/2003 | Hurley et al. |
| 2016/0223769 A1 | 8/2016 | Ito et al. |

FOREIGN PATENT DOCUMENTS

| CN | 102681119 A | 9/2012 |
| EP | 3056932 A1 | 8/2016 |
| JP | H09-178989 A | 7/1997 |
| JP | 2010-026196 A | 2/2010 |
| JP | 2012-088454 A | 5/2012 |
| JP | 2013-088547 A | 5/2013 |
| WO | 2015/052951 A1 | 4/2015 |
| WO | WO-2015053146 A1 * | 4/2015 |

OTHER PUBLICATIONS

Machine translation of WO-2015053146-A1 (Year: 2015).*

(Continued)

*Primary Examiner* — Ryan A Lepisto
(74) *Attorney, Agent, or Firm* — Osha Liang LLP

(57) ABSTRACT

An optical fiber unit includes a plurality of optical fibers; and two binding materials that bind the optical fibers. The two binding materials are wound around the optical fibers in an SZ shape, and are adhered to each other at respective reversed portions that form an adhesive part. The adhesive part has a plurality of intersection points of center lines of the two binding materials.

11 Claims, 6 Drawing Sheets

(56) References Cited

OTHER PUBLICATIONS

Office Action issued in corresponding Japanese Patent Application No. 2016-183490 dated Oct. 24, 2017 (3 pages).
Notice of Allowance issued in corresponding Japanese Patent Application No. 2016-183490 dated Feb. 27, 2018 (3 pages).
Office Action issued in corresponding Taiwanese Patent Application No. 106131566 dated Oct. 22, 2018 (5 pages).

* cited by examiner

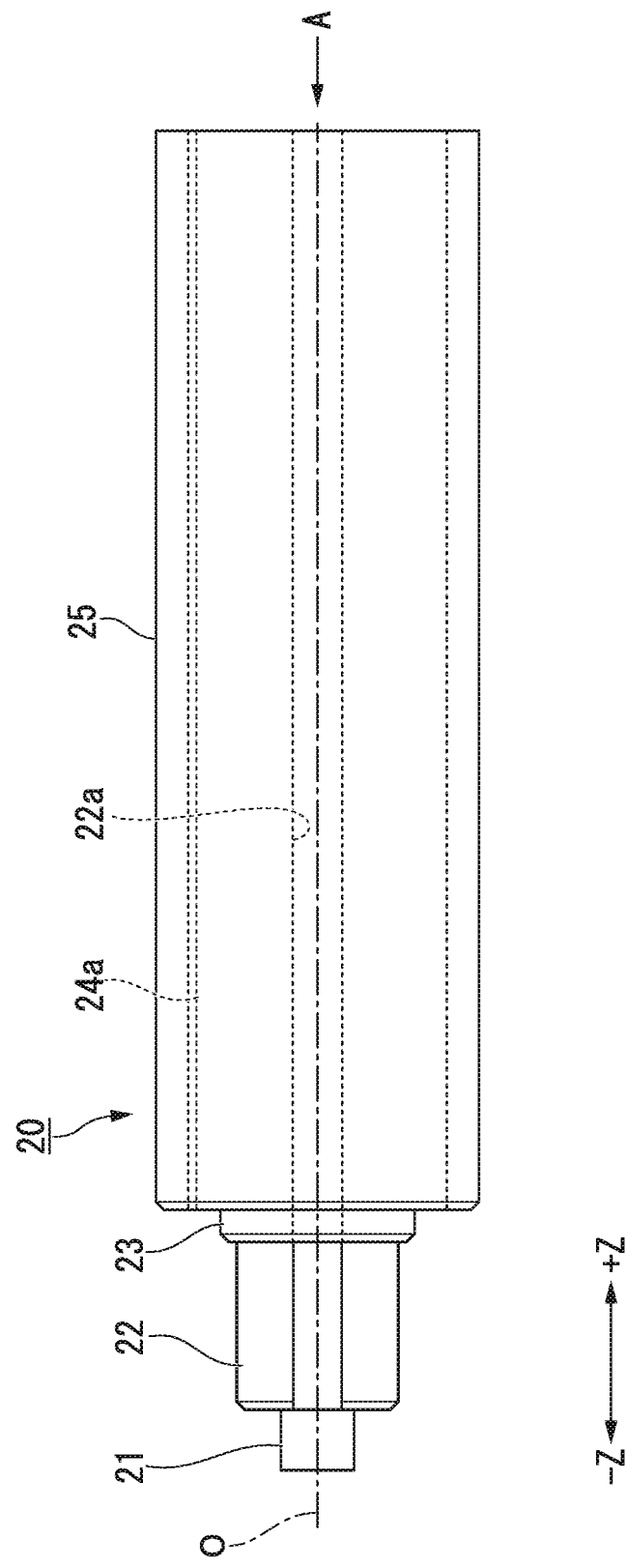

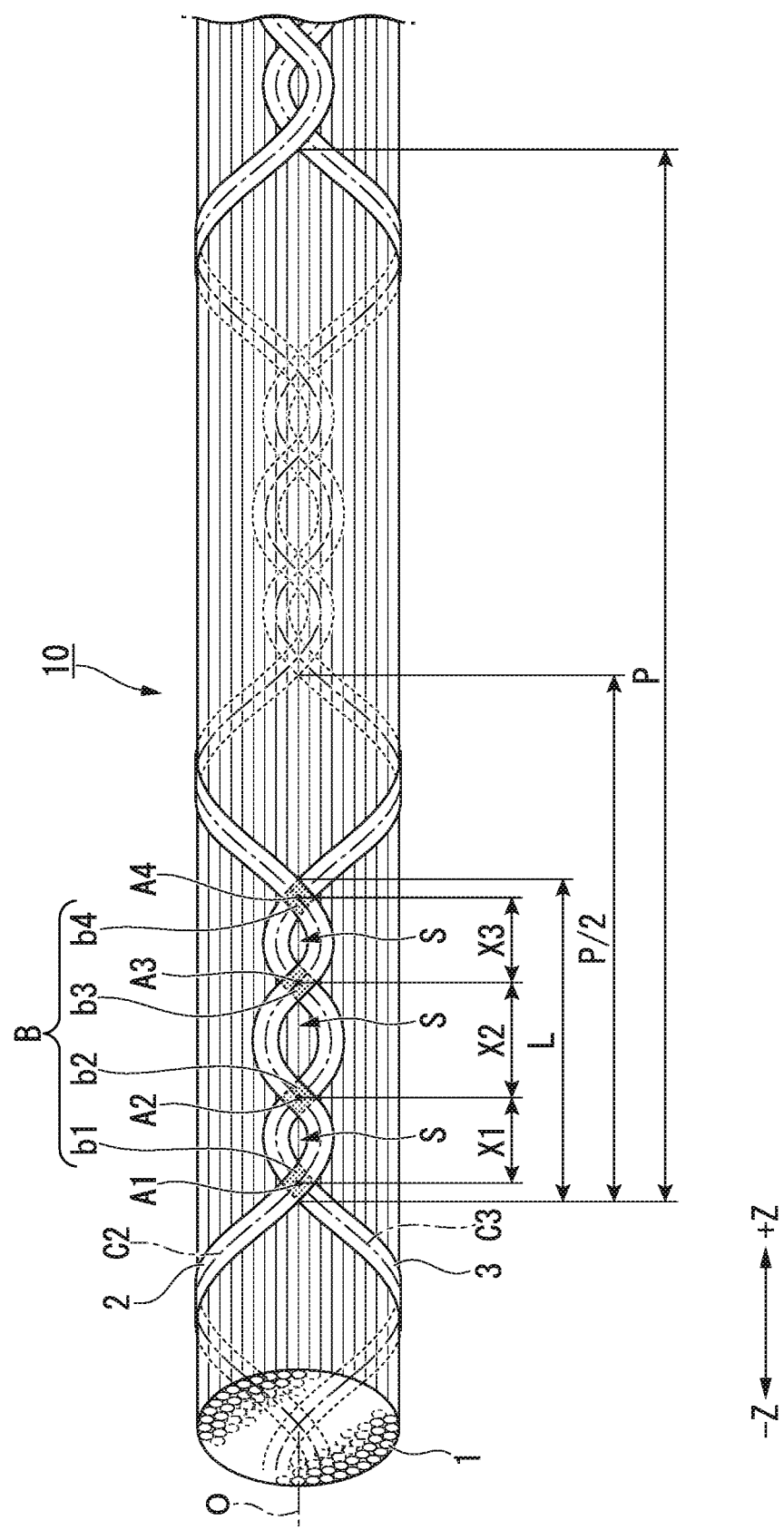

OPTICAL FIBER UNIT AND OPTICAL FIBER CABLE

CROSS-REFERENCE TO RELATED APPLICATIONS

The present application claims priority to Japanese Patent Application No. 2016-183490, filed on Sep. 20, 2016, the content of which is incorporated herein by reference.

BACKGROUND

In the related art, as disclosed in Patent Document 1, an optical fiber unit formed by winding binding materials on a plurality of optical fiber cores or optical fiber strands (hereinafter, simply referred to as optical fibers). In the optical fiber unit, binding materials are wound, so it is possible to prevent the bundle of optical fibers from becoming loose, and it is also possible to improve the discrimination among the plurality of optical fiber units depending on the colors of binding materials.

In addition, Patent Document 2 below proposes an optical fiber unit in which a plurality of binding materials are wound in an SZ shape on a bundle of optical fibers, and two binding materials are adhered to each other at reversed portions in the winding direction. According to this configuration, when the part at which the two binding materials are adhered to each other is peeled off, the binding around the peeled part is released and the binding at other parts is maintained. Thus, it is possible to improve workability of intermediate post-branching or the like of the optical fiber unit.

PRIOR ART DOCUMENTS

[Patent Document 1] Japanese Unexamined Patent Application, First Publication No. 2010-26196
[Patent Document 2] Japanese Unexamined Patent Application, First Publication No. 2012-88454

By the way, in the optical fiber unit described in Patent Document 2, since binding materials are adhered to each other at reversed portions, the adhesive part could be unexpectedly peeled off, so that the binding state tends to become unstable.

SUMMARY

One or more embodiments of the present invention can stabilize the binding state of the binding material wound in an SZ shape on a plurality of optical fibers.

An optical fiber unit according to one or more embodiments of the present invention includes a plurality of optical fibers, and at least two binding materials that bind the plurality of optical fibers, in which the two binding materials are wound around the plurality of optical fibers in an SZ shape, and are adhered to each other at respective reversed portions to form an adhesive part, and the adhesive part includes a plurality of intersection points of center lines of the two binding materials.

According to one or more embodiments of the optical fiber unit, two binding materials overlap each other in a sufficient range, for example, even in a case where there is a variation in the position where the reversed portion of each binding material is formed or the shape of the reversed portion, at the time of manufacturing the optical fiber unit. Therefore, the adhesive part can be reliably formed, and it is possible to stabilize a binding state of the binding material.

According to one or more embodiments of the optical fiber unit, the adhesive part includes a plurality of adhesive surfaces where the binding materials overlap each other, and the plurality of adhesive surfaces are disposed at intervals in a longitudinal direction in which the optical fiber unit extends.

As a result, according to one or more embodiments, for example, when the force for separating the binding material acts on the whole adhesive part, this external force can be received on all of the plurality of adhesive surfaces. Accordingly, it is possible to prevent the adhesive part from being unexpectedly peeled off. On the other hand, when intentionally peeling off the adhesive part and taking out the optical fiber, the adhesive surface can be easily peeled off, for example, by concentrating the force separating the binding materials on one adhesive surface. Then, by sequentially peeling the adhesive surfaces in the longitudinal direction, the adhesive part can be peeled off with a small operating force, and it is possible to facilitate intermediate post-branching or the like.

According to one or more embodiments of the optical fiber unit, a gap is formed between the plurality of adhesive surfaces and the two binding materials.

As a result, according to one or more embodiments, since a gap of the two binding materials is formed between the adhesive surfaces, the areas of the adhesive surfaces are prevented from being greatly changed, for example, even in a case where there is variation in the position where the reversed portions of the binding materials are formed or variation in the shapes of the reversed portions. Thus, it is possible to easily stabilize the strength of the adhesive part at the time of manufacturing the optical fiber unit.

According to one or more embodiments of the optical fiber unit, the adhesive part includes four or more intersection points of center lines of the two binding materials.

As a result, according to one or more embodiments, the length of the adhesive part in the longitudinal direction is secured, and thus it is possible to further stabilize the binding state of the binding material.

According to one or more embodiments of the optical fiber unit, an adhesion length L of the adhesive part in a longitudinal direction in which the optical fiber extends and a binding pitch P of the binding material in the longitudinal direction satisfy $0.24 \leq L/(P/2) \leq 0.8$.

As a result, according to one or more embodiments, since the value of $L/(P/2)$ is 0.24 or more, the length in the longitudinal direction that the adhesive part occupies in the entire binding material is secured, and thus it is possible to prevent the adhesive part from being unexpectedly peeled off. Further, since the value of $L/(P/2)$ is set to 0.8 or less, when manufacturing the optical fiber unit, it is possible to prevent the occurrence of an adhesion failure caused by a short distance in the longitudinal direction or a short time from the formation of the adhesive part to the inversion of the binding materials.

According to one or more embodiments of the optical fiber unit, the adhesive strength of the adhesive part is 11.6 gf or more and 95.2 gf or less.

As a result, according to one or more embodiments, since the adhesive strength of the adhesive part is set to 11.6 gf or more, it is possible to prevent the adhesive part from being unexpectedly peeled off. Further, since the adhesive strength of the adhesive part is set to 95.2 gf or less, it is possible to improve the workability in peeling the binding materials at the adhesive part.

According to one or more embodiments of the optical fiber unit, an overlap ratio of the two binding materials is greater than 100% and equal to or less than 125%.

As a result, according to one or more embodiments, by making the overlap ratio of the binding materials larger than 100%, the adhesive surfaces of the binding materials are reliably formed, and thus, it is possible to stabilize the binding state. Further, by setting the overlap ratio to 125% or less, it is possible to secure the area of the adhesive surface, and increase the adhesive strength.

An optical fiber cable according to one or more embodiments of the present invention includes the optical fiber unit, and a sheath that covers the optical fiber unit.

According to the optical fiber cable of one or more embodiments, the binding materials are wound around a plurality of optical fibers in an SZ shape, and the binding state of the binding material is stable. Therefore, the bundle of optical fibers is suppressed from becoming loose, the discrimination of the optical fiber unit is secured, and the workability of intermediate post-branching or the like of the optical fiber cable is improved.

According to one or more embodiments of the present invention, it is possible to stabilize the binding state of a binding material wound around a plurality of optical fibers in an SZ shape.

BRIEF DESCRIPTION OF DRAWINGS

FIG. 3A is a side view of a binding device viewed in a radial direction.

FIG. 5 is a schematic diagram showing the configuration of an optical fiber unit according to one or more embodiments.

DETAILED DESCRIPTION

Figure 1:
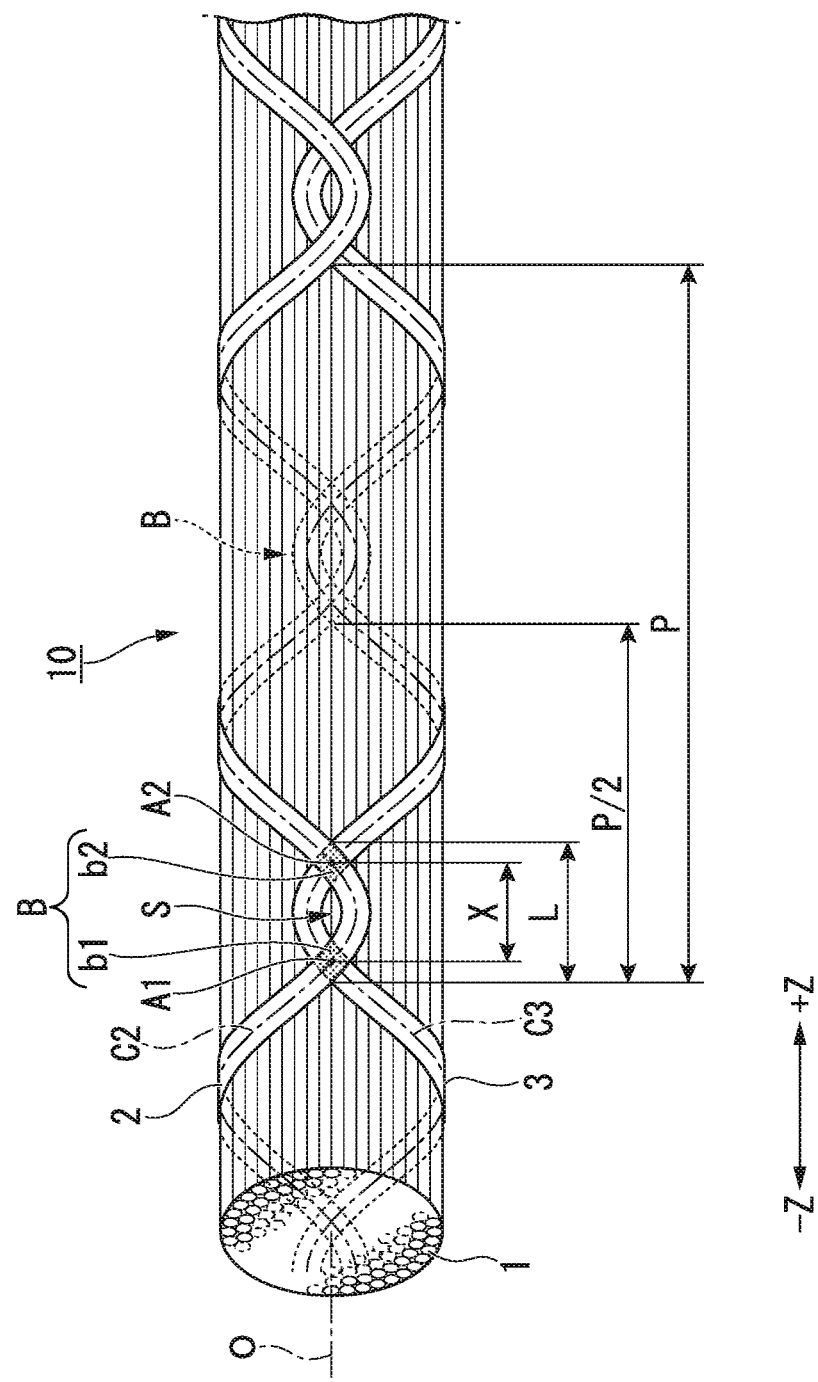
FIG. 1 is a schematic diagram showing the configuration of an optical fiber unit according to one or more embodiments.

The configuration of the optical fiber unit according to one or more embodiments will be described below with reference to FIGS. 1 to 6B.

In the drawings used in the following description, in order to make the invention easier to understand, illustration of each component may be omitted, the scale may be changed, and the shape is may be simplified in some cases.

As shown in FIG. 1, an optical fiber unit 10 includes a plurality of optical fibers 1, and two binding materials 2, 3 binding the plurality of optical fibers 1.

(Direction Definition)

As shown in FIG. 1, the plurality of optical fibers 1 are bundled into a cylinder shape as a whole. In one or more embodiments, the center axis of the cylinder is referred to as a central axis O. Further, a direction in which the optical fiber unit 10 extends, that is, a direction along the central axis O, is referred to as a longitudinal direction. The Z axis in FIGS. 1, 3A, 5, 6A, and 6B indicates the longitudinal direction. Further, in a front view as viewed from the longitudinal direction, a direction intersecting the central axis O is referred to as a radial direction, and a direction revolving around the central axis O is referred to as a circumferential direction.

The plurality of optical fibers 1 may be bundled into a columnar shape having a non-circular (elliptical, square, or the like) cross section, or the cross sectional shape thereof may be changed in the longitudinal direction. In this case, an imaginary line connecting the centroid of the section of the optical fiber unit 10 in the longitudinal direction is defined as the central axis O.

As the plurality of optical fibers 1, for example, one obtained by bundling a plurality of 12-core intermittent adhesive optical fiber tape cores can be used.

The binding materials 2, 3 are formed in a band shape. As the binding materials 2, 3, for example, a material obtained by combining a plurality of fibers made of a high melting point material such as polyethylene terephthalate (PET) or a low melting point material such as polypropylene (PP) can be used. The configuration and material of the binding materials 2, 3 are not limited to those described above, and can be appropriately changed.

The binding materials 2, 3 are wound around the plurality of optical fibers 1 in an SZ shape, and are adhered to each other at respective reversed portions to form an adhesive part B. The binding materials 2, 3 are thermally fused to each other at an adhesive part B by a binding device 20 which will be described later. There are cases where a plurality of optical fiber units 10 are disposed in the optical fiber cable. In order to discriminate among the plurality of optical fiber units 10 in the optical fiber cable, the binding materials 2, 3 may be colored differently.

Figure 2:
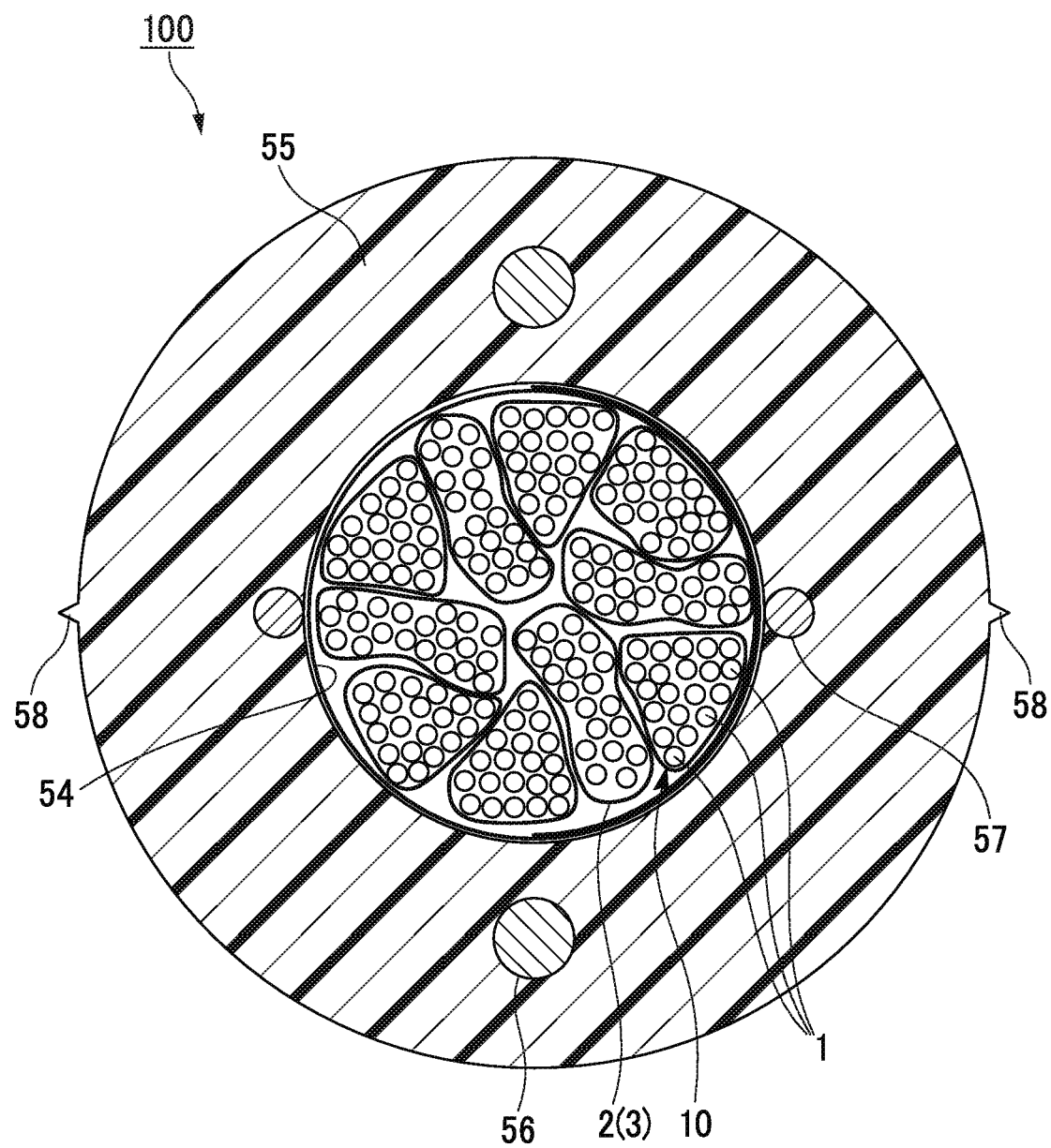
FIG. 2 is a sectional view showing the configuration of an optical fiber cable including the optical fiber unit in FIG. 1.

The optical fiber unit 10 is used by being accommodated in an optical fiber cable 100 as shown in FIG. 2, for example.

The optical fiber cable 100 includes a plurality of optical fiber units 10, a wrapping tube 54, a cylindrical sheath 55, a pair of strength members 56, and a pair of rip cords 57.

The wrapping tube 54 covers the plurality of optical fiber units 10. The sheath 55 covers the optical fiber unit 10 together with the wrapping tube 54. The pair of strength members 56 is buried in the sheath 55. The pair of rip cords 57 is buried in the sheath 55. The pair of rip cords 57 is disposed in a position close to the inner peripheral surface of the sheath 55. Marker protrusions 58 are protruded from the outer peripheral surface of the sheath 55, on the radially outer side at the positions where the pair of rip cords 57 are disposed. The marker protrusion 58 is formed along the rip cord 57 and indicates the buried position of the rip cord 57. The optical fiber cable 100 may not include the wrapping tube 54, the strength member 56, the rip cord 57, and the marker protrusion 58. Further, the optical fiber cable 100 may have only one optical fiber unit 10.

Next, a method of manufacturing the optical fiber unit 10 shown in FIG. 1 will be described.

Figure 3B:
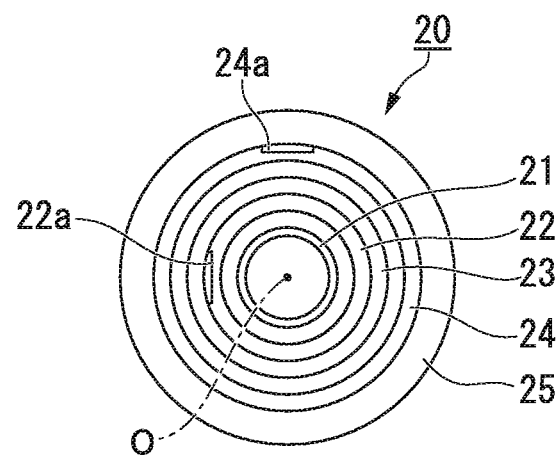
FIG. 3B is a view in a direction of arrow A in FIG. 3A.

The optical fiber unit 10 is formed by winding the binding materials 2, 3 around a plurality of optical fibers 1, by using the binding device 20 as shown in FIGS. 3A and 3B.

FIG. 3A is a side view of the binding device 20 as viewed from a direction orthogonal to the longitudinal direction, and FIG. 3B is a view in the direction of arrow A in FIG. 3A.

As shown in FIGS. 3A and 3B, the binding device 20 is configured with a plurality of cylindrical members. The binding device 20 includes a guide cylinder 21, a first inner cylinder 22, a first outer cylinder 23, a second inner cylinder 24, and a second outer cylinder 25 in order from the inside. These members are disposed in a state where their center axes are located on the central axis O. The plurality of optical fibers 1 are inserted into the guide cylinder 21.

The first inner cylinder 22 is fitted in the first outer cylinder 23 in a state of being rotatable around the central axis O with respect to the first outer cylinder 23. A groove portion 22a extending over the entire length in the longitudinal direction is formed on the outer peripheral surface of the first inner cylinder 22. The binding material 2 is inserted into the groove portion 22a.

The second inner cylinder 24 is fitted in the second outer cylinder 25 in a state of being rotatable around the central axis O with respect to the second outer cylinder 25. A groove portion 24a extending over the entire length in the longitudinal direction is formed on the outer peripheral surface of the second inner cylinder 24. The binding material 3 is inserted into the groove portion 24a.

The first inner cylinder 22 and the second inner cylinder 24 are connected to a common power source (not shown) and configured to rotate around the central axis O in association with the supply of power. When forming the optical fiber unit 10, as the plurality of optical fibers 1 pass through the guide cylinder 21 and are drawn out to the downstream side, the binding materials 2, 3 in the groove portions 22a, 24a are wound around the plurality of optical fibers 1 in an SZ shape. Since the binding materials 2, 3 are heated and partially melted in the groove portions 22a, 24a, the binding materials 2, 3 are thermally fused to each other in the reversed portions of the SZ shape.

The binding materials 2, 3 may not be heated in the groove portions 22a, 24a but may be heated in a heating die (not shown) disposed downstream of the binding device 20. In this case, the binding materials 2, 3 exit the binding device 20 in a state where the binding materials 2, 3 are wound around the plurality of optical fibers 1 in the SZ shape and then, are thermally fused to each other in the heating die.

Next, an example of the optical fiber unit 10 of one or more embodiments will be described.

In FIG. 1, C2 is the center line of the binding material 2, and C3 is the center line of the binding material 3. As shown in FIG. 1, the center lines C2, C3 intersect twice in the reversed portions of the binding material 2 and the binding material 3. That is, two binding materials 2, 3 are adhered to each other in the respective reversed portions to form an adhesive part B, and the adhesive part B includes a plurality of intersection points of the center lines C2, C3. Thus, the adhesive part B includes two adhesive surfaces b1, b2 where the binding materials 2, 3 overlap each other. The adhesive surfaces b1, b2 are disposed with an interval in the longitudinal direction. The adhesive surface b1 is located on the −Z side, and the adhesive surface b2 is located on the +Z side. Further, a gap S between the binding materials 2, 3 is formed between the pair of adjacent adhesive surfaces, namely adhesive surface b1 and the adhesive surface b2. The intersection point is a point where the center lines C2, C3 intersect when the adhesive part B is viewed from the radially outer side of the optical fiber unit 10.

Here, the length of the adhesive part B in the longitudinal direction is referred to as an adhesion length L. The adhesion length L is a distance between the end portion on the −Z side of the adhesive surface b1 and the end portion on the +Z side of the adhesive surface b2 in the longitudinal direction. Further, as shown in FIG. 1, the pitch of binding in the longitudinal direction of the binding materials 2 and 3 wound in the SZ shape is referred to as a binding pitch P. The binding pitch P is a unit in which the shapes of the binding materials 2, 3 are repeated in the longitudinal direction.

Further, as shown in FIG. 1, the distance between the intersection point A1 and the intersection point A2 of the center lines C2, C3 in the longitudinal direction is referred to as a distance X between the intersection points.

FIG. 5 is a diagram showing one or more embodiments of the optical fiber unit 10. In one or more embodiments shown in FIG. 5, the binding materials 2, 3 are inverted three times at the reversed portions, respectively. Thus, the adhesive part B includes four intersection points A1 to A4 of center lines C2, C3. Further, the adhesive part B includes four adhesive surfaces b1 to b4. Four adhesive surfaces b1 to b4 are disposed with an interval in the longitudinal direction. Thus, a gap S between the binding materials 2, 3 is formed at three places in the adhesive part B (i.e., as shown in FIG. 5, a gap S is formed between each adjacent pair of the adhesive surfaces b1 to b4, resulting in three gaps S).

The number of times of inverting the binding materials 2, 3 in one reversed portion is not limited to one or more embodiments of FIGS. 1 and 5. For example, in a case where the binding materials 2, 3 are inverted N times at the reversed portion, the number of intersection points of the center lines C2, C3 is (N+1).

As shown in FIG. 5, in a case where three or more intersection points of the center lines C2, C3 are present at one adhesive part B, the average value of a distance between adjacent intersection points in the longitudinal direction is defined as the distance X between the intersection points. In one or more embodiments of FIG. 5, when a distance between the intersection point A1 and the intersection point A2, a distance between the intersection point A2 and the intersection point A3, and a distance between the intersection point A3 and the intersection point A4 in the longitudinal direction are set to X1, X2, and X3, respectively, the average value of X1 to X3 is defined as the distance X between the intersection points.

Further, in a case where three or more adhesive surfaces are present in one adhesive part B, the distance in the longitudinal direction between the outer ends of adhesive surfaces located at both ends in the longitudinal direction is defined as an adhesion length L. In one or more embodiments shown in FIG. 5, the adhesive surface b1 is located on the most −Z side, and the adhesive surface b4 is located on the most +Z side. In this case, a distance in the longitudinal direction between the end portion on the −Z side of the adhesive surface b1 and the end portion on the +Z side of the adhesive surface b4 is defined as the adhesion length L.

Figure 4:
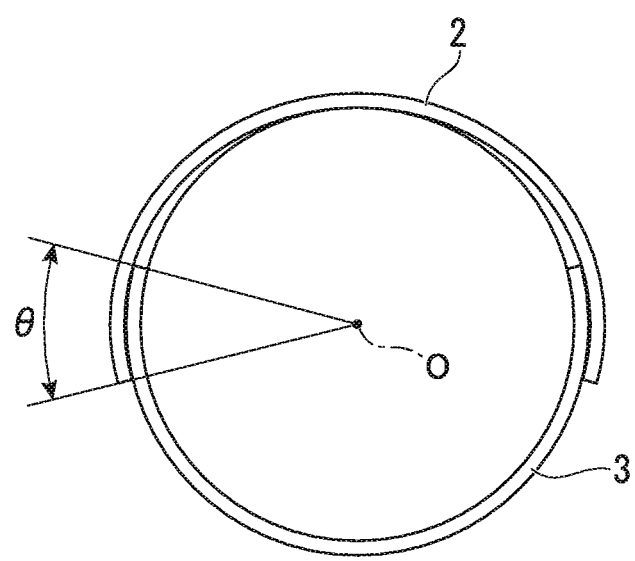
FIG. 4 is a diagram for explaining an overlap ratio.

FIG. 4 is a front view of the optical fiber unit 10 viewed from the longitudinal direction. In FIG. 4, the illustration of the optical fiber 1 is omitted. As shown in FIG. 1, FIG. 4, and FIG. 5, the reversed portion of the binding material 2 covers the reversed portion of the binding material 3 from outside in the radial direction. That is, the reversed portion of the binding material 2 and the reversed portion of the binding material 3 overlap each other.

As shown in FIG. 4, in the front view, the overlapping portion of the binding materials 2, 3 extends in the circumferential direction. The angle of a portion where binding materials 2, 3 overlap around the central axis O is θ [°]. In this case, the overlap ratio R[%] is defined by the following Expression (1).

$$R = 100(1 + \theta/180) \tag{1}$$

A plurality of optical fiber units 10 are prepared using the distance X between the intersection points, the adhesion length L, the binding pitch P, and the overlap ratio R defined above as parameters, and the results of measuring the strength of the adhesive part, or the like are shown in Table 1.

TABLE 1

| Binding method | Comparative Example | Example 1 | Example 2 | Example 3 | Example 4 | Example 5 | Example 6 | Example 7 | Example 8 |
| --- | --- | --- | --- | --- | --- | --- | --- | --- | --- |
| Binding pitch P (mm) | 150 | 150 | 150 | 150 | 150 | 150 | 200 | 200 | 200 |
| Adhesion length L (mm) | 8 | 18 | 36 | 50 | 60 | 70 | 75 | 75 | 75 |
| Distance X between intersection points (mm) | 0 | 8 | 16 | 23 | 30 | 40 | 40 | 17 | 6 |
| Number of intersection points | 1 | 2 | 2 | 2 | 2 | 2 | 2 | 4 | 6 |
| L/P | 0.05 | 0.12 | 0.24 | 0.33 | 0.40 | 0.47 | 0.38 | 0.38 | 0.38 |
| L/(P/2) | 0.11 | 0.24 | 0.48 | 0.67 | 0.80 | 0.93 | 0.75 | 0.75 | 0.75 |
| Adhesive strength (gf) | 4.0 | 20.1 | 37.3 | 35.4 | 19.5 | 11.6 | 35.2 | 68.5 | 95.2 |
| Overlap ratio (%) | 100 | 115 | 115 | 115 | 115 | 115 | 115 | 115 | 115 |
| Post-cabling loss (dB/km) | 0.20 | 0.20 | 0.21 | 0.21 | 0.20 | 0.20 | 0.21 | 0.23 | 0.25 |
| Number (pcs) of destroyed adhesive parts per 3 m | 40 | 0 | 0 | 0 | 0 | 4 | 0 | 0 | 0 |
| Probability (%) of destroyed adhesive parts per 3 m | 100.0 | 0.0 | 0.0 | 0.0 | 0.0 | 10.0 | 0.0 | 0.0 | 0.0 |

In the optical fiber unit of a comparative example and Examples 1 to 8 shown in Table 1, six pieces of 12-core intermittent adhesive optical fiber tape cores are used as the plurality of optical fibers 1. Further, the two binding materials 2, 3 are wound around six intermittent adhesive optical fiber tape cores in an SZ shape, and the reversed portions of the binding materials 2, 3 are thermally fused to each other to form an adhesive part B. In the comparative example and Examples 1 to 8, the binding materials 2, 3 formed by combining a plurality of fibers including PET and PP and having a width of 1 [mm] are used.

In the comparative example shown in Table 1, the binding materials 2, 3 are thermally fused to each other such that the center lines C2, C3 of the binding materials 2, 3 are crossed at one point. Since the center lines C of the respective binding materials 2, 3 cross each other at one point, a distance X between the intersection points is 0 [mm], but the respective binding materials 2, 3 have a width of 1 [mm], so the adhesion length L is 8 [mm].

On the other hand, for example, in Example 1, the center lines C2, C3 of the binding materials 2, 3 have two intersection points as shown in FIG. 1, the distance X between the intersection points is 8 [mm], and the adhesion length L is 18 [mm], which is 10 [mm] longer than in the comparative example.

Further, for example, in Example 7, the center lines C2, C3 of the binding materials 2, 3 have four intersection points as shown in FIG. 4, the distance X between the intersection points is 17 [mm], and the adhesion length L is 75 [mm].

In addition, Example 8 is an optical fiber unit in which the binding materials 2, 3 are each inverted five times in the reversed portions, and there are six intersection points of the center lines C2, C3 for one adhesive part B.

L/P shown in Table 1 is a value obtained by dividing the adhesion length L [mm] by a binding pitch P [mm]. For example, in Example 1, the adhesion length L=18 [mm] and the binding pitch P=150 [mm], so L/P=18/150=0.12.

L/(P/2) shown in Table 1 indicates the ratio of the length of the adhesive part B to the length of the optical fiber unit 10 in the longitudinal direction. To explain in detail, in a case where there are two binding materials, two adhesive parts B are present per binding pitch P as shown in FIG. 1. Therefore, the numerical value obtained by dividing the adhesion length L by P/2 is a ratio of the length of the adhesive part B to the length of the optical fiber unit 10 in the longitudinal direction. For example, in Example 1, it is established that L/(P/2)=18/(150/2)=0.24.

The adhesive strength [gf] shown in Table 1 is a peak value of tensile force when the binding materials 2, 3 are pulled apart in the circumferential direction at a speed of 200 [mm/min] in the adhesive part B, and the adhesive part B is peeled off.

The post-cabling loss [dB/km] shown in Table 1 is the result of generating an optical fiber cable 100 as shown in FIG. 2, and measuring the maximum value of the transmission loss of the optical fiber 1 at the measurement wavelength of 1.55 [μm], by using the optical fiber unit 10 in the comparative example and Examples 1 to 8.

When the optical fiber unit 10 is taken out of the optical fiber cable 100, the number of destroyed adhesive parts B (peeling or adhesion failure) per 3 [m] and the probability [%] thereof are shown in Table 1. For example, in a case where two binding materials are used and the binding pitch P is 150 [mm], the adhesive part B is included at a rate of one in 75 [mm], so the optical fiber unit of 3 [m] includes 3000÷75=40 adhesive parts B. In a comparative example, since destruction is confirmed for all of the 40 adhesive parts B, the probability of the destruction of the adhesive parts B per 3 [m] is 100 [%].

In Example 1, the number of destroyed adhesive parts B per 3 [m] is greatly reduced to 0 from 40, in comparison with the comparative example. This is because the adhesive strength is improved from 4.0 [gf] to 20.1 [gf], and the adhesive part B is hardly broken. The reason for the increase in adhesive strength is that the number of intersection points of the center lines C2, C3 per one adhesive part B increases from 1 to 2 and the value of L/(P/2) indicating the ratio of adhesive part B increases from 0.11 to 0.24.

As described above, by increasing the number of intersection points of the center lines C2, C3 and the value of L/(P/2) and the adhesive strength, the probability of the destruction of the adhesive part B can be reduced.

Next, the optimum numerical range of L/(P/2) will be considered.

Focusing on the numerical values of L/(P/2) for the comparative example and Examples 1 to 8, the minimum value is 0.11 in the comparative example, and the next smallest value is 0.24 in Example 1. The probability of destruction of the adhesive part B per 3 [m] is 100% in the comparative example, and 0% in Example 1. From the result, the optimal value of L/(P/2) for preventing destruction of the adhesive part B is a range shown by the following Expression (2).

$$0.24 \leq L/(P/2) \quad (2)$$

On the other hand, in a case where the value of L/(P/2) is large, when the binding materials 2, 3 are wound around the plurality of optical fibers 1 in an SZ shape, the distance in the longitudinal direction or time from the formation of the adhesive part B to the inversion of the binding materials 2, 3 is shortened. Therefore, adhesion failure in the adhesive part B of the binding materials 2, 3 is likely to occur. Thus, it is desirable to set a value which is small to some extent for L/(P/2).

Among the examples shown in Table 1, in Example 5 where the value of L/(P/2) is 0.93, as a result of the adhesion failure of the binding materials 2, 3 due to the large value of L/(P/2), it is considered that the adhesive part B is destroyed with a probability of 10%. Further, the next largest value of L/(P/2) after Example 5 is 0.80 of Example 4, but the destruction of the adhesive part B is not confirmed for Example 4. From this result, it can be seen that the value of L/(P/2) could be in a range shown by the following Expression (3).

$$L/(P/2) \leq 0.8 \quad (3)$$

From the above considerations and Expressions (2) and (3), it can be said that it is optimal to set the value of L/(P/2) to the range shown in the following Expression (4).

$$0.24 \leq L/(P/2) \leq 0.8 \quad (4)$$

Next, the optimum numerical range of adhesive strength will be considered.

Focusing on the numerical value of the adhesive strength for the comparative example and Examples 1 to 8, the minimum value is 4.0 [gf] in the comparative example, and the next smallest value is 11.6 [gf] in Example 5. Further, the probability of destruction of the adhesive part B per 3 [m] is 100% in the comparative example, and 10% in Example 5, which is greatly improved. From this result, it can be seen that destruction of the adhesive part B can be suppressed to some extent by setting the adhesive strength to 11.6 [gf] or more.

In addition, the next lowest adhesive strength after Example 5 is 19.5 [gf] of Example 4, and the probability of destruction of the adhesive part B per 3 [m] is 0% in Example 4. From this result, it can be seen that destruction of the adhesive part B can be prevented more reliably by setting the adhesive strength to 19.5 [gf] or more.

On the other hand, in a case where the value of the adhesive strength is excessively large, it is difficult to peel off the binding materials 2, 3 at the adhesive part B, and thus it is considered difficult to perform the intermediate post-branching. The optical fiber unit 10 is taken out from the optical fiber cable 100 of each of Examples 1 to 8 and the workability when the binding materials 2, 3 are peeled at the adhesive part B is confirmed. As a result, in Example 8 in which the adhesive strength is the largest, 95.2 [gf], there is no decrease in workability in separating the binding materials 2 and 3. From this result, it can be seen that the adhesive strength could be set to 95.2 gf or less to prevent deterioration of workability when peeling off the adhesive part B.

Accordingly, a condition for easily maintaining the separating work of the binding materials 2, 3 in the adhesive part B while preventing the adhesive part B from being unexpectedly broken may be that the adhesive strength be 11.6 gf or more and 95.2 gf or less. Further, in a case where the adhesive strength is set to 19.5 [gf] or more, destruction of the adhesive part B can be more reliably prevented.

Next, the optimum numerical range of the overlap ratio R will be considered.

The condition for the center line C2, C3 of the binding materials 2, 3 to have a plurality of intersection points in the adhesive part B is that θ in FIG. 4 be greater than 0[°]. From the definition of the overlap ratio R shown in Expression (1), in a case where θ is larger than 0[°], the overlap ratio R is larger than 100[%]. That is, by making the overlap ratio R larger than 100[%], it is possible to configure the optical fiber unit 10 such that the center lines C2, C3 of the binding materials 2, 3 have a plurality of intersection points in the adhesive part B.

Further, in a case where the binding materials 2, 3 are wound in an SZ shape, it is common to define the winding shape of the binding materials 2, 3 such that each of the center lines C2, C3 draw a sine curve. Here, in a case where θ in FIG. 4 exceeds 45[°], that is, in a case where the overlap ratio R exceeds 125%, the center lines C2, C3 cross at an angle close to a right angle at the intersection points A1 and A2. When the center lines C2, C3 intersect at an angle close to a right angle, the areas of the adhesive surfaces b1, b2 become relatively small.

Therefore, by setting the overlap ratio R to 125% or less, it is possible to secure the areas of the adhesive surfaces b1, b2, and increase the adhesive strength.

Next, the optimum numerical range of the distance X between the intersection points will be considered.

In a case where the distance X between the intersection points is excessively small, the formation of intersection points A1, A2 of the center lines C2, C3 is likely to become unstable, and the shapes of the adhesive surfaces b1, b2 are likely to become unstable. As a result, the adhesive strength also becomes unstable. Therefore, it is desirable that the distance X between the intersection points be, for example, 33 mm or more.

Further, in a case where the distance X between the intersection points is excessively large, the easiness of discrimination among the plurality of optical fiber units 10 by the binding materials 2, 3 is lowered. Therefore, it is desirable that the distance X between the intersection points be, for example, 59 mm or less.

The optimum values of L/(P/2), the adhesive strength, the overlap ratio R, and the distance X between the intersection points merely show one or more embodiments of the present invention, and the technical scope of the present invention is not limited to the ranges of these numerical values.

As described above, according to one or more embodiments of the optical fiber unit 10, a plurality of binding materials 2, 3 are wound around the plurality of optical fibers 1 in the SZ shape. A plurality of intersection points A1, A2 of the center lines C2, C3 of the binding materials 2, 3 are included in the adhesive part B where the reversed portions of the binding materials 2, 3 are adhered to each other. With this configuration, the adhesive part B can be reliably formed, even in a case where there is variation in the position where the reversed portion of each of the binding materials 2, 3 is formed or variation in the shape of the reversed portion, at the time of manufacturing the optical fiber unit 10. Accordingly, it is possible to stabilize the binding state of the binding materials 2, 3.

Further, for example, when the force separating the binding materials 2, 3 acts on the whole adhesive part B, the external force can be received on all of the plurality of adhesive surfaces b1, b2 formed at intervals in the longitudinal direction. Therefore, it is possible to prevent the adhesive parts b1, b2 from being unexpectedly peeled off. On the other hand, when intentionally peeling off the adhesive parts b1, b2 and taking out the optical fiber 1, the adhesive surface b1 can be easily peeled off, for example, by concentrating the force separating the binding materials 2, 3 on one adhesive surface b1. Then, by sequentially peeling the adhesive surfaces b1, b2 in the longitudinal direction, the adhesive part B can be peeled off with a small operating force, and it is possible to facilitate the intermediate post-branching or the like.

Further, since a gap S of the binding materials 2, 3 is formed between the adhesive surfaces b1, b2 the areas of the adhesive surfaces b1, b2 are prevented from being greatly changed, for example, even in a case where there is variation in the position where the reversed portions of the binding materials 2, 3 are formed or the shapes of the reversed portions. Thus, it is possible to easily stabilize the adhesive strength of the adhesive part B at the time of manufacturing the optical fiber unit 10.

Further, as shown in FIG. 5, in a case where the adhesive part B includes four or more intersection points of center lines C2, C3 of the binding materials 2, 3, the length of the adhesive part B in the longitudinal direction is secured, and it is possible to further stabilize the binding state of the binding materials 2, 3.

In a case where the value of L/(P/2) is set to 0.24 or more, the length occupied by the adhesive part B in the longitudinal direction in the entire binding materials 2, 3 is secured, and thus it is possible to prevent the adhesive part B from being unexpectedly peeled off. Further, in a case where the value of L/(P/2) is set to 0.8 or less, when manufacturing the optical fiber unit 10, it is possible to prevent the occurrence of an adhesion failure caused by a short distance in the longitudinal direction or a short time from the formation of the adhesive part B to the inversion of the binding materials 2, 3.

In a case where the adhesive strength of the adhesive part B is set to 11.6 gf or more, it is possible to prevent the adhesive part B from being unexpectedly peeled off. Further, in a case where the adhesive strength of the adhesive part B is set to 95.2 gf or less, it is possible to improve the workability in peeling the binding materials 2, 3 at the adhesive part B.

By making the overlap ratio of the binding materials 2, 3 larger than 100%, the adhesive surfaces b1, b2 of the binding materials 2, 3 are reliably formed, and thus, it is possible to stabilize the binding state. Further, by setting the overlap ratio to 125% or less, it is possible to secure the areas of the adhesive surfaces b1, b2 and increase the adhesive strength.

Further, according to one or more embodiments of the optical fiber cable 100, the binding materials 2, 3 are wound around the plurality of optical fibers 1 in the SZ shape, and the binding state of the binding materials 2, 3 is stable. With this configuration, discrimination of the optical fiber unit 10 is secured while suppressing the bundle of optical fibers 1 from becoming loose, and it is possible to improve workability of intermediate post-branching or the like of the optical fiber cable 100.

It should be noted that the technical scope of the present invention is not limited to the above-described embodiments, and various modifications can be made without departing from the spirit of the present invention.

For example, in one or more embodiments, the binding materials 2, 3 are thermally fused to each other to form the adhesive surfaces b1 to b4, but the present invention is not limited thereto. For example, the adhesive surfaces b1 to b4 may be formed by adhering the binding materials 2, 3 with an adhesive.

Figure 6A:
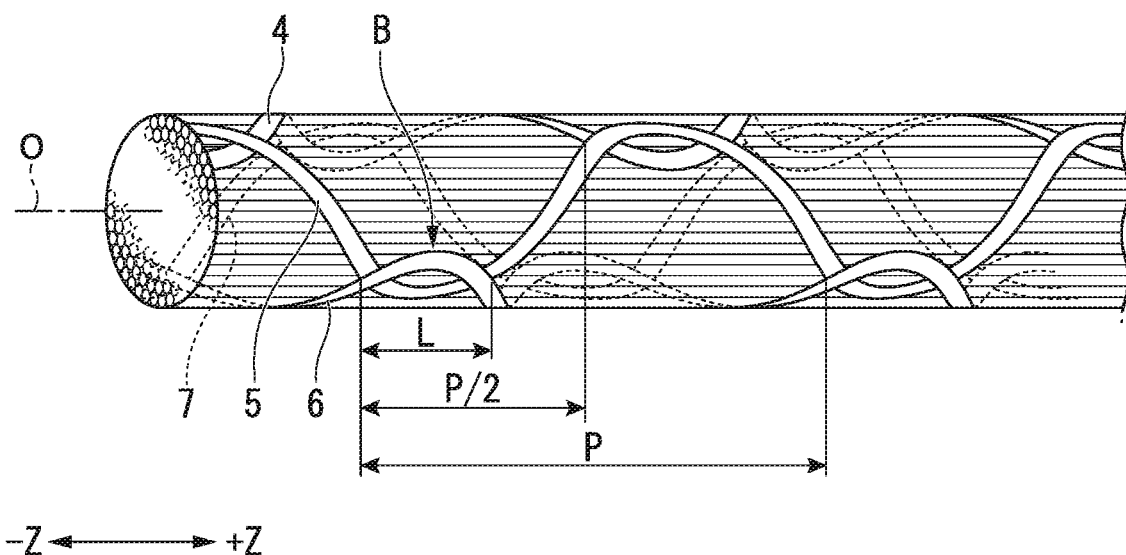
FIG. 6A is a schematic diagram for explaining the configuration of an optical fiber unit according to one or more embodiments.
Figure 6B:
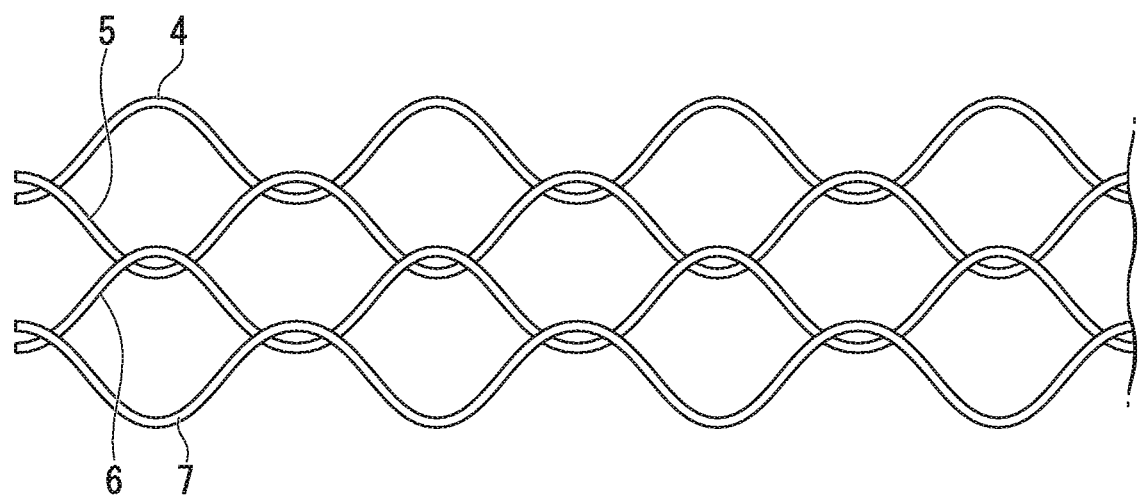
FIG. 6B is a developed view of the binding materials of FIG. 6A.

In the previously-described embodiments, the optical fiber unit 10 is provided with the two binding materials 2, 3, but the present invention is not limited thereto, and may adopt, for example, the optical fiber unit 10 having three or more binding materials. For example, FIG. 6A shows a case where four binding materials 4, 5, 6, and 7 are wound around a plurality of optical fibers 1 in an SZ shape. When the binding materials 4, 5, 6, and 7 in FIG. 6A are developed in a plane, FIG. 6B is obtained.

As shown in FIG. 6A, even in a case where more than two binding materials are wound in the SZ shape, the adhesion length L and the binding pitch P are defined similarly as in the case of two binding materials. Therefore, even in a case where three or more binding materials are wound in the SZ shape, the optical fiber unit 10 is configured so as to satisfy $0.24 \leq L/(P/2) \leq 0.8$, so it is possible to prevent the adhesive part B from being unintentionally peeled off, and it is possible to prevent occurrence of adhesion failure of the binding materials 2, 3 at the time of manufacturing.

Further, without departing from the spirit of the present invention, it is possible to appropriately replace the constituent elements in the previously-described embodiments with well-known constituent elements. Examples of the previously-described embodiments may be appropriately combined with one another.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: optical fiber, 10: optical fiber unit, 2, 3: binding material, 100: optical fiber cable, C2, C3: center line, A1, A2, A3, A4: intersection point, B: adhesive part, b1, b2, b3, b4: adhesive surface, L: adhesion length, O: central axis, P: binding pitch, S: gap

The invention claimed is:
1. An optical fiber unit comprising:
a plurality of optical fibers; and
two binding materials that bind the optical fibers, wherein the two binding materials are wound around the optical fibers in an SZ shape, and are adhered to each other at reversed portions that form a plurality of adhesive parts, center lines of the two binding materials intersect multiple times at a plurality of intersection points in each of the adhesive parts, and two adjacent intersection points in each of the adhesive parts are disposed at intervals in a longitudinal direction in which the optical fiber unit extends.

2. The optical fiber unit according to claim 1, wherein each of the adhesive parts has a plurality of adhesive surfaces where the two binding materials overlap each other, and the adhesive surfaces are disposed at intervals in the longitudinal direction.

3. The optical fiber unit according to claim 2, wherein a gap between the two binding materials is formed between adjacent adhesive surfaces.

4. The optical fiber unit according to claim 1, wherein each of the adhesive parts has four or more intersection points of center lines of the two binding materials.

5. The optical fiber unit according to claim 1, wherein an adhesion length L of each of the adhesive parts in the longitudinal direction and a binding pitch P of the binding material in the longitudinal direction satisfy $0.24 \leq L/(P/2) \leq 0.8$.

6. The optical fiber unit according to claim 1, wherein adhesive strength of each of the adhesive parts is equal to or greater than 11.6 gf and equal to or less than 95.2 gf.

7. The optical fiber unit according to claim 1, wherein in a front view as viewed from the longitudinal direction, an angle of a portion where the two binding materials overlap around a central axis of the optical fiber unit is $\theta[°]$, an overlap ratio R[%] defined by $R=100(1+\theta/180)$ is greater than 100% and equal to or less than 125%.

8. An optical fiber cable comprising:
the optical fiber unit according to claim 1; and
a sheath that covers the optical fiber unit.

9. The optical fiber cable according to claim 8, further comprising:
a pair of rip cords buried in the sheath.

10. An optical fiber unit comprising:
a plurality of optical fibers; and
two binding materials that bind the optical fibers, wherein
the two binding materials are wound around the optical fibers in an SZ shape, and are adhered to each other at reversed portions that form a plurality of adhesive parts,
center lines of the two binding materials intersect multiple times at a plurality of intersection points in each of the adhesive parts, and
a gap between the two binding materials is formed between adjacent two points among the intersection points.

11. An optical fiber unit comprising:
a plurality of optical fibers; and
at least two binding materials that bind the plurality of optical fibers,
wherein the two binding materials are wound around the plurality of optical fibers in an SZ shape with a binding pitch P, and are adhered to each other at reversed portions to form a plurality of adhesive parts,
wherein each of the adhesive parts is disposed in each half of the binding pitch P, and each of the adhesive parts includes a plurality of intersection points of center lines of the two binding materials as viewed in a first direction orthogonal to a longitudinal direction in which the optical fiber unit extends, and
wherein each of the adhesive parts includes a plurality of adhesive surfaces where the binding materials overlap each other, and the plurality of adhesive surfaces are disposed at intervals in the longitudinal direction.

* * * * *